United States Patent
Sulemanji

(10) Patent No.: US 9,862,156 B2
(45) Date of Patent: Jan. 9, 2018

(54) ENVIRONMENTALLY FRIENDLY AEROSOLIZED LATEX TIRE SEALANT

(71) Applicant: Illinois Tool Works Inc., Glenview, IL (US)

(72) Inventor: Shees N. Sulemanji, Grover Beach, CA (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 15/072,152

(22) Filed: Mar. 16, 2016

(65) Prior Publication Data

US 2016/0311183 A1    Oct. 27, 2016

Related U.S. Application Data

(63) Continuation-in-part of application No. 15/056,987, filed on Feb. 29, 2016.

(60) Provisional application No. 62/151,549, filed on Apr. 23, 2015.

(51) Int. Cl.
*B29C 73/16*    (2006.01)

(52) U.S. Cl.
CPC .................................. *B29C 73/163* (2013.01)

(58) Field of Classification Search
CPC .................................................... B29C 73/163
USPC .......................................................... 523/166
See application file for complete search history.

(56) References Cited

U.S. PATENT DOCUMENTS

| | | |
|---|---|---|
| 2,357,650 A | 9/1944 | Hall |
| 3,352,696 A | 11/1967 | Wallace |
| 3,739,829 A | 6/1973 | Powell et al. |
| 4,337,322 A | 6/1982 | Jaspon |
| 4,501,825 A | 2/1985 | Magyar et al. |
| 5,371,136 A | 12/1994 | Brooks et al. |
| 5,466,518 A | 11/1995 | Isaac et al. |
| 5,856,376 A | 1/1999 | Wong |
| 6,063,837 A | 5/2000 | Kawamura et al. |
| 6,454,892 B1 | 9/2002 | Gerresheim et al. |
| 6,818,596 B1 | 11/2004 | Hayes |
| 6,840,990 B2 | 1/2005 | Gallagher et al. |
| 6,864,305 B2 | 3/2005 | Kishida et al. |
| 7,388,041 B2 | 6/2008 | Cegelski et al. |
| 7,868,061 B2 | 1/2011 | Cegelski et al. |
| 8,772,370 B1 | 7/2014 | Sulemanji |
| 2004/0010059 A1 | 1/2004 | Kojima et al. |
| 2004/0048962 A1 | 3/2004 | Kojima et al. |
| 2012/0125235 A1 | 5/2012 | Azeyanagi et al. |

FOREIGN PATENT DOCUMENTS

| | | |
|---|---|---|
| DE | 198 44 177 B4 | 4/2000 |
| EP | 0 200 382 A2 | 12/1986 |
| EP | 0 753 420 B1 | 1/1997 |
| EP | 0 846 552 A2 | 6/1998 |
| EP | 0 846 552 B1 | 6/1998 |
| EP | 0 200 382 B1 | 12/1998 |
| EP | 0 972 616 B1 | 1/2000 |
| EP | 0 988 960 A2 | 3/2000 |
| EP | 1 372 941 B1 | 1/2004 |
| EP | 2719665 A1 | 4/2014 |
| FR | 1.016.016 | 10/1952 |
| JP | 2003-82327 | 3/2003 |
| JP | 2003-193029 | 7/2003 |
| WO | WO 2006/058104 A2 | 6/2006 |
| WO | WO 2007/112010 | 10/2007 |
| WO | WO 2007/112010 A2 | 10/2007 |

*Primary Examiner* — Edward Cain

(74) *Attorney, Agent, or Firm* — Maxwell J. Petersen; Lewis Brisbois Bisgaard & Smith

(57) ABSTRACT

An environmentally friendly aerosol sealing composition for tire repair can simultaneously repair a punctured flat tire and inflate the flat tire to a pressure suitable for driving. The tire sealant composition includes a sealant concentrate and an aerosol propellant. The sealant concentrate is water-based and includes a glycerin antifreeze agent and a natural rubber latex that suitably has a mechanical stability of at least about 1050 seconds, and is substantially free of coagulants.

23 Claims, No Drawings

ND FRIENDLY AEROSOLIZED LATEX TIRE SEALANT

ENVIRONMENTALLY FRIENDLY AEROSOLIZED LATEX TIRE SEALANT

RELATED APPLICATIONS

This application is a continuation-in-part of U.S. patent application Ser. No. 15/056,987, filed Feb. 29, 2016, which claims priority to U.S. Provisional Application Ser. No. 62/151,549, filed on Apr. 23, 2015.

FIELD OF THE INVENTION

This invention is directed to an environmentally friendly, non-flammable sealing composition for tire repair that can be injected using aerosol spraying techniques.

BACKGROUND OF THE INVENTION

Various known tire sealants contain ethylene glycol as an antifreeze agent. Antifreeze agents are needed in order for the sealants to be effective at cold winter temperatures, sometimes approaching −30° C. or lower. However, ethylene glycol is toxic to the environment.

Various improved tire sealants use other organic antifreeze agents that are environmentally safer than ethylene glycol. U.S. Pat. Nos. 7,388,041 and 7,868,061, both to Cegelski et al., disclose a puncture sealing composition that includes at least a rubber latex and an antifreeze agent. The antifreeze agent can be glycerin, potassium acetate, or a solution of glycerin and potassium acetate, suitably mixed with water. U.S. Pat. No. 8,772,370, issued to Sulemanji, discloses a puncture sealing composition that includes at least a rubber latex and an aqueous antifreeze solution. The aqueous antifreeze solution includes an antifreeze agent selected from the group consisting of trimethyl glycerine, dimethyl sulfoxide, and combinations thereof.

U.S. Patent Application Publication 2011/0257282 to Alexander describes an effort to combine aqueous tire sealants with an aerosol propellant to facilitate injection and uniform dispensing of the tire sealant. This technology is deemed useful for injecting tire sealant into tires at locations remote from service stations. For instance, if a tire is flat, a pressurized container filled with sufficient quantities of aerosol propellant/tire sealant to inflate the tire at ambient temperature, to yield a tire pressure that is sufficient to support the weight of the vehicle and drive to a tire repair facility.

When aerosol injection is used, the ingredients of the tire sealant should be uniformly dispersed to facilitate uniform dispensing of the tire sealant. For instance, poor mixing of the propellant/inflator with the remaining ingredients of the tire sealant can result in incomplete or ineffective dispensing of the sealing composition. Additionally, the tire sealant must be injected under sufficient pressure to overcome the resistance of the valve, sometimes called the "maximum injection pressure" needed to open the valve and initiate the injection. Once the valve is opened, the tire sealant can flow into the tire at a lower pressure, sometimes called the "drop injection pressure."

There is a need or desire for an aerosol tire sealant that overcomes the resistance of the valve more easily, enabling greater efficiency in inflating the tire using a pressurized aerosol sealant container.

SUMMARY OF THE INVENTION

The present invention is directed to an aerosol tire sealant composition that is environmentally friendly, non-flammable, and capable of being injected at low maximum injection pressure and low drop injection pressure. This enables the aerosol tire sealant to be injected more easily through the valve stem of a tire without removing the core and seal, and facilitates inflation of the tire using the pressurized aerosol sealant container.

In one embodiment, the tire sealing composition includes a sealant concentrate and an aerosol propellant. The sealant concentrate includes glycerin, water, and a natural rubber latex having a mechanical stability of at least about 1050 seconds. The aerosol propellant can be selected from the group consisting of hydrofluorocarbons, hydrofluoroolefins, and combinations thereof.

In another embodiment, the tire sealing composition includes about 20 to about 80% by weight of a sealant concentrate and about 20 to about 80% of an aerosol propellant. The sealant concentrate includes about 1 to about 50% by weight glycerin, about 20 to about 75% by weight water, about 5 to about 50% by weight natural rubber latex having a mechanical stability of at least about 1050 seconds, and about 5 to about 50% by weight synthetic rubber latex. The aerosol propellant can include a hydrofluoroolefin.

In another embodiment, the tire sealing composition includes a tire sealant and an aerosol propellant. The tire sealant concentrate includes glycerin, water, an emulsifier, a natural rubber latex having a mechanical stability of at least about 1050 seconds, and a synthetic rubber latex. The aerosol propellant constitutes about 20 to about 80% by weight of the tire sealing composition.

With the foregoing in mind, it is a feature and advantage of the invention to provide an environmentally friendly, non-flammable aerosol tire sealing composition, that can be readily injected through the valve stem of a tire without removing the core and seal, using a pressurized aerosol container. The tire sealing composition can be injected using sufficient pressure to inflate the tire, enabling the vehicle to be driven to a service station if needed.

These and other features and advantages will become further apparent from the following detailed description of the invention.

DETAILED DESCRIPTION OF THE INVENTION

The present invention is directed to a tire sealing composition that can be injected through the valve stem of a punctured tire, using a pressurized aerosol container, without removing the core and seal of the valve stem. The tire sealant composition can also be readily discharged through the aerosol container orifice. The tire sealing composition is non-flammable and environmentally friendly compared to various known tire sealing compositions. When injected using a pressurized aerosol container operating at up to about 150-650 psig, or higher, the sealing composition can substantially fill a punctured tire, creating adequate tire pressure for driving, in addition to sealing the puncture.

The tire sealing composition includes a sealant concentrate and an aerosol propellant, uniformly mixed before use to ensure uniform dispensing into the tire. When the tire sealing composition is dispensed using an aerosol can or other aerosol container, the uniform mixing can be accomplished by shaking the container immediately before use. The tire sealant composition can include at least about 15% by weight of the sealant concentrate, suitably at least about 20% by weight, or at least about 25% by weight, or at least about 30% by weight, or at least about 35% by weight, or at least about 40% by weight. The tire sealing composition may include not more than about 85% by weight of the sealant concentrate, or not more than about 80% by weight, or not more than about 75% by weight, or not more than about 70% by weight, or not more than about 65% by weight, or not more than about 60% by weight. The tire sealing composition can constitute at least about 15% by weight of the aerosol propellant, suitably at least about 20% by weight, or at least about 25% by weight, or at least about 30% by weight, or at least about 35% by weight, or at least about 40% by weight. The tire sealant composition may include not more than about 85% by weight of the aerosol propellant, or not more than about 80% by weight, or not more than about 75% by weight, or not more than about 70% by weight, or not more than about 65% by weight, or not more than about 60% by weight.

The sealant concentrate includes at least glycerin, water, and a natural rubber latex having a mechanical stability of at least about 1050 seconds. The sealant concentrate may also include a synthetic rubber latex and an emulsifier.

Glycerin in an environmentally friendly antifreeze agent that depresses the freezing point of the tire sealing composition, preserving its usefulness in cold weather. The sealant concentrate should include at least about 1% by weight glycerin, or at least about 2% by weight, or at least about 3% by weight, or at least about 4% by weight. The sealant concentrate may include not more than about 50% by weight glycerin, or not more than about 35% by weight or not more than about 20% by weight, or not more than about 10% by weight. The sealant concentrate and the tire sealant composition are suitably free of ethylene glycol. Ethylene glycol, a conventional antifreeze agent, is more harmful to the environment.

The water is a substantial component of the sealant concentrate, facilitating dispersion of the ingredients, ease of injection and flow of the tire sealing composition into and within the punctured tire. The sealant concentrate may include at least about 20% by weight water, or at least about 40% by weight, or at least about 55% by weight. The sealant concentrate may include not more than about 80% by weight water, or not more than about 75% by weight, or not more than about 70% by weight.

The natural rubber latex is used for sealing the puncture in a tire. The natural rubber latex should be substantially free of coagulants, and suitably has an average particle size of about 400 microns or less. The small particle size and absence of coagulants facilitate passage of the tire sealing composition through the discharge orifice of the aerosol container, and through the valve stem of the tire without removing the core and seal, and also facilitates effective sealing of the puncture. The small particle size and removal of coagulants can be accomplished by preparing a highly filtered natural rubber latex, by filtering the natural rubber latex through a mesh screen. The mesh screen can have openings of about 300 to about 500 microns, suitably about 400 microns. Pumping the natural rubber latex through a mesh screen places it in a fine, free-flowing state. The highly filtered natural rubber latex can also be biodegradable.

The natural rubber latex can, in one embodiment, include about 55-65% by weight natural rubber, up to about 0.25% by weight ammonia, and a balance substantially of water. One suitable natural rubber latex, which is highly filtered as described above, is sold by Centrotrade Rubber, Inc. under the name CENTEX HF. CENTEX HF has a total solid content of about 61-63% by weight, a dry natural rubber content of about 59-61% by weight, an ammonia content of about 0.60-0.80% by weight, and a balance substantially of water, and is biodegradable.

The mechanical stability test is one way of determining if the natural rubber latex is sufficiently free of coagulants. The mechanical stability test, which can be performed by the supplier, measures the amount of time required for the natural rubber latex to begin coalescing under conditions of agitation. Centrotrade Rubber, Inc. measures mechanical stability by stirring a batch of highly filtered natural rubber latex at 14,000 rpm until latex instability is noted, evidenced by coagulation of a small amount (about 1%) of the natural rubber latex. The time, reported in seconds, is reported for each batch.

It has been discovered that the mechanical stability of the natural rubber latex correlates inversely with the maximum injection pressure and drop injection pressure of tire sealants made using the natural rubber latex. Specifically, when the mechanical stability of the natural rubber latex is less than about 1050 seconds, the resulting tire sealant either clogs the valve stem during injection, or requires a relatively high maximum injection pressure and a relatively high drop injection pressure for successful injection. When the mechanical stability of the natural rubber latex is about 1050 seconds or higher, the tire sealant injects smoothly through the valve stem requiring significantly lower maximum injection pressure and drop injection pressure. Thus, for purposes of this invention, the natural rubber latex should have mechanical stability of at least about 1050 seconds.

The sealant concentrate can include at least about 5% by weight of the natural rubber latex, or at least about 10% by weight, or at least about 15% by weight. The sealant concentrate may include not more than about 50% by weight of the natural rubber latex, or not more than about 35% by weight, or not more than about 20% by weight.

Synthetic rubber latex can be included in the sealant concentrate. When used, the synthetic rubber latex can augment the sealing performance of the natural rubber latex. The synthetic rubber latex is also substantially free of coagulants which, if present, could promote coagulation of the synthetic rubber latex and/or the natural rubber latex. When the synthetic rubber latex is present, the sealant concentrate may include at least about 1% by weight of the synthetic rubber latex, or at least about 5% by weight, or at least about 10% by weight. The sealant concentrate may include not more than about 50% by weight synthetic rubber latex, or not more than about 35% by weight, or not more than about 20% by weight.

The synthetic rubber latex may have an average particle size of about 400 microns or less, for ease of injection. Suitable synthetic rubbers for the synthetic rubber latex include without limitation styrene-butadiene rubbers, acrylonitrile-butadiene rubbers, ethylene vinyl acetates, chloroprene rubbers, vinyl pyridine rubbers, butadiene rubbers, and combinations thereof.

The sealant concentrate may also include an emulsifier. An emulsifier is typically a surfactant that modifies the surface tension of the liquid medium in a way that prevents or discourages coalescence of the natural rubber latex and/or the synthetic rubber latex. The emulsifier can be an anionic surfactant, an ampholytic surfactant, a carboxylic acid type surfactant, or the like. One suitable emulsifier is EMULSOGEN® EPN 118, available from Clariant. EMULSOGEN® EPN 118 is a nonionic water-soluble emulsifier based on an alkyl polyethylene glycol ether. When an emulsifier is used, the sealant concentrate can include about 0.1 to about 10% by weight of the emulsifier, suitably about 1.0 to about 5.0% by weight, or about 2.0 to about 3.0% by weight. Rust and corrosion inhibitors can also be included at up to about 5% by weight. It has been found that higher amounts of emulsifier exceeding 2.0% by weight improve the stability of the rubber latex in the tire sealing composition, during storage in the pressurized aerosol can. This helps prevent clogging and sputtering as the tire sealing composition is dispensed from the can and injected into the fire valve. A nonionic cationic or anionic surfactant can also be added to improve the rubber latex stability.

The aerosol propellant should be an environmentally friendly aerosol propellant that does not harm the ecosystem or the atmosphere. Suitable aerosol propellants include without limitation hydrofluorocarbons, hydrofluoroolefins, dimethoxyethanol, nitrogen, propane, and combinations thereof. Hydrofluoroolefins differ from hydrofluorocarbons in that the former are derivatives of alkenes (olefins) rather than alkanes. Hydrofluoroolefins are particularly desirable because they do not adversely affect the ozone layer of the atmosphere. One suitable aerosol propellant is 1,3,3,3-tetrafluoro-1-propene, which is a hydrofluoroolefin derived from propene. Both the cis and trans versions of 1,3,3,3-tetrafluoropropene are highly suitable. Other propene-derived hydrofluoroolefins include 2,3,3,3-tetrafluoropropene, which is also suitable as an aerosol propellant. Other hydrofluoropropenes and hydrofluoroethylenes can be also used. Hydrofluorocarbons, and blends of hydrofluoroolefins with hydrofluorocarbons, can also be used.

EXAMPLES

Example 1

An aerosol-based tire sealing composition containing 72% by weight sealant concentrate and 28% by weight 1,3,3,3-tetrafluoro-1-propene (commercially available as HFO-1234ze) was prepared. The sealant concentrate had the following composition.

TABLE 1

| Ingredient | Brand | Percent By Weight |
|---|---|---|
| Glycerin | | 5.0 |
| Deionized Water | | 65.0 |
| Natural Rubber Latex | CENTEX ® HF | 17.0 |
| Synthetic Rubber Latex | Styrene butadiene latex | 12.5 |
| Emulsifier | EMULSOGEN ® EPN 118 | 0.5 |

The ingredients were blended together and stored in aerosol cans having a volume of 16 ounces and a storage pressure (70° F.) of 58 psig. Each resulting tire sealing composition was injected through the valve stem of a punctured automobile tire, namely a Falken Tire, Type 245/45ZR17. Injection of each sealing composition simultaneously repaired the puncture and inflated the tire to an initial pressure of about 9.0 to 12.0 psig and a final pressure (after a 25-mile drive) of 10.5 to 14.0 psig.

Three different puncture sizes were inflicted into the tires, namely 8 d (3/16 inch), 20 d (1/4 inch) and a standard drywall screw size. The results are indicated in Table 2 below.

TABLE 2

| Run # | Puncture Size | Puncture Location | Valve Clogged | Leakage Rate (PSI/min) | Initial Pressure | PSI After Run | Sealed | MVP Met |
|---|---|---|---|---|---|---|---|---|
| 1 | 20 d | center | no | 3.0 | 10.5 | 12.0 | Yes | Yes |
| 2 | 20 d | outer | n/a | n/a | 11.0 | 13.5 | Yes | Yes |
| 3 | drywall | outer | n/a | n/a | 11.0 | 13.0 | Yes | Yes |
| 4 | 20 d | shoulder | n/a | n/a | 12.0 | 12.0 | Yes | Yes |
| 5 | 20 d | center | no | 0.3 | 10.0 | 12.5 | Yes | Yes |
| 6 | 8 d | outer | n/a | n/a | 11.5 | 13.0 | Yes | Yes |
| 7 | 20 d | outer | n/a | n/a | 11.5 | 13.5 | Yes | Yes |
| 8 | 20 d | shoulder | n/a | n/a | 11.5 | 11.5 | Yes | Yes |
| 9 | 20 d | outer | no | 5.4 | 9.0 | 10.5 | Yes | Yes |
| 10 | 20 d | outer | no | 4.8 | 11.5 | 14.0 | Yes | Yes |
| 11 | drywall | outer | no | 2.2 | 10.5 | 12.5 | Yes | Yes |
| 12 | 8 d | outer | no | 2.2 | 9.0 | 10.0 | Yes | Yes |

In each run, the tire sealing composition injected from the aerosol container not only sealed the tire, but caused enough inflation to enable the tire to be driven 25 miles. The tires remained sealed, evidenced by the fact that the ultimate tire pressures equaled or exceeded the initial tire pressures.

Example 2

In order to determine the impact of mechanical stability of natural rubber latex on the ease of injection of a tire sealant, a non-aerosol tire sealing composition was prepared that could be injected under conditions of controlled and measurable pressure. By optimizing the mechanical stability of natural rubber latex for a non-aerosol formulation, it was reasonably understood that the same optimization will apply to the ease of injection of an aerosol tire sealing composition which is discharged from a container at higher, variable and less controllable pressures. The non-aerosol tire sealing composition had the following composition.

TABLE 3

| Ingredient | Percent By Weight |
|---|---|
| Glycerin | 18.75 |
| Propylene Glycol | 18.75 |
| Deionized Water | 12.5 |
| Highly Filtered Natural Rubber Latex (CENTEX ® HF) | 50.0 |
| TOTAL | 100 |

Five batches of CENTEX® HF highly filtered natural rubber latex were tested for mechanical stability by the supplier. Stirring was applied to each batch of the highly filtered natural rubber latex at 14,000 rpm until latex instability was noted, evidenced by coagulation of a small amount (about 1%) of the natural rubber latex. The time, in seconds, was measured from the onset of stirring to the onset of coagulation.

Each of the five batches was converted into a tire sealant according to the above formulation. Each of the tire sealants was added to an OEM bottle used with an OEM compressor kit supplied by Illinois Tool Works Inc. for the purpose of injecting the tire sealant into a tire. The bottles of tire sealant were conditioned in an oven at 70° C. for 24 hours. The valve of the tire was also conditioned at 70° C. In each case, the tire sealant was injected through the valve stem without removing the core and seal.

The injection pressures were measured for each tire sealant. The maximum pressure was the initial pressure needed to start the injection process. The drop pressure was the pressure needed to sustain the injection process once it started. As shown in Table 4 below, higher mechanical stabilities of the highly filtered natural rubber latex, in excess of 1050 seconds, generally resulted in greater ease of injection, as demonstrated by lower injection pressures.

TABLE 4

Mechanical Stabilities and Injection Pressures

| CENTEX ® HF Batch No. | Mechanical Stability, Sec. | Maximum Injection Pressure, psi | Drop Injection Pressure, psi |
| --- | --- | --- | --- |
| BFG 414 | 1085 | 38 | 15 |
| BRE 414 | 1275 | 38 | 15 |
| BHE 410 | 1023 | 80 | 60 |
| BYM 412 | 950 | Clogged the valve stem | Clogged the valve stem |
| BLC 414 | 960 | 67 | 22 |

Example 3

This Example employed a tire sealing composition similar to Example 1, namely an aerosol-based sealing composition containing 72% by weight sealant concentrate and 28% by weight 1,3,3,3-tetrafluoro-1-propene (HFO-1234ze). The sealant concentrate differed from that described in Table 1, above, in that the emulsifier content, EMULSOGEN® EPN 118, was increased to 2.5% by weight, and the deionized water content was reduced to 63.0% by weight.

Raising the emulsifier content to 2.5% by weight improved the stability of the rubber latex in the tire sealing composition in the commercial environmentally friendly aerosol cans, available from Aerofil Technology, Inc. When the commercial aerosol cans were filled with the tire sealing composition at 650 psi, using a temperature of 80° C., the tire sealing composition entered the aerosol cans freely and did not later coagulate within the cans. The tire sealing composition could then be dispensed from the cans and into the tires without clogging or sputtering and without clogging the tire valve core. Optionally, a nonionic, cationic or anionic surfactant can also help stabilize the rubber latex in the tire sealing composition.

The embodiments of the invention described herein are presently preferred. Various modifications and improvements can be made without departing from the spirit and scope of the invention. The scope of the invention is defined by the appended claims, and all changes that fall within the meaning and range of equivalents are intended to be embraced therein.

I claim:

1. A tire sealing composition, comprising a sealant concentrate and an aerosol propellant;
the sealant concentrate comprising glycerin, water, and a natural rubber latex having a mechanical stability of at least about 1050 seconds;
the aerosol propellant selected from the group consisting of hydrofluorocarbons, hydrofluoroolefins, dimethoxyethanol, nitrogen, propane and combinations thereof.

2. The tire sealing composition of claim 1, wherein the natural rubber latex is a highly filtered natural rubber latex having an average particle size of about 400 microns or less.

3. The tire sealing composition of claim 1, wherein the sealant concentrate further comprises synthetic rubber latex.

4. The tire sealing composition of claim 1, wherein the sealant concentrate further comprises an emulsifier, in an amount of at least about 2.0% by weight.

5. The tire sealing composition of claim 1, wherein the aerosol propellant comprises a hydrofluoroolefin selected from the group consisting of hydrotluoroethenes, hydrofluoropropenes, and combinations thereof.

6. The tire sealing composition of claim 5, wherein the aerosol propellant is selected from the group consisting of 2,3,3,3-tetrafluoropropene, cis-3,3,3-etrafluoropropene, trans-1,3,3,3-tetrafluoropropene, and combinations thereof.

7. The tire sealing composition of claim 1, wherein the natural rubber latex comprises about 55-65% by weight natural rubber, up to about 0.25% by weight ammonia, and a balance substantially of water.

8. The tire sealing composition of claim 1, comprising about 20 to about 80% by weight of the sealant concentrate and about 20 to about 80% by weight of the aerosol propellant.

9. A tire sealing composition, comprising about 20 to about 80% by weight of a sealant concentrate and about 20 to about 80% by weight of an aerosol propellant;
the sealant concentrate comprising about 1 to about 50% by weight glycerin, about 20to about 80% by weight water, about 5 to about 50% by weight natural rubber latex having a mechanical stability of at least about 1050 seconds, and about 5 to about 50% by weight synthetic rubber latex;
the aerosol propellant comprising a hydrofluoroolefin.

10. The tire sealing composition of claim 9, wherein the sealant concentrate further comprises an emulsifier.

11. The tire sealing composition of claim 10, wherein the emulsifier constitutes at least about 2.0% by weight of the sealant concentrate.

12. The tire sealing composition of claim 9, comprising about 30 to about 70% by weight of the sealant concentrate and about 30 to about 70% by weight of the aerosol propellant.

13. The tire sealing composition of claim 9, wherein the sealant concentrate comprises about 2 to about 20% by weight glycerin, about 40 to about 75% by weight water, about 10 to about 25% natural rubber latex having a mechanical stability of at least about 1050 seconds, and about 10 to about 25% by weight of a synthetic rubber latex.

14. The tire sealing composition of claim 9, wherein the aerosol propellant is selected from the group consisting of tetrafluoropropenes and combinations thereof.

15. The tire sealing composition of claim 10, wherein the emulsifier comprises an alkyl polyethylene glycol ether.

16. The tire sealing composition of claim 9, wherein the natural ubber latex has an average particle size of about 400 microns or less.

17. A tire sealing composition, comprising a sealant concentrate and an aerosol propellant;

the sealant concentrate comprising glycerin, water, an emulsifier, a natural rubber latex having a mechanical stability of at least about 1050 seconds, and a synthetic rubber latex;

the aerosol propellant constituting about 20 to about 80% by weight of the tire sealing composition.

18. The tire sealing composition of claim 17, wherein the aerosol propellant is selected from the group consisting of hydrofluorocarbons, hydrofluoroolefins, and combinations thereof.

19. The tire sealing composition of claim 17, wherein the aerosol propellant comprises a hydrofluoroolefin selected from the group consisting of hydrofluoroethenes, hydrofluoropropenes, and combinations thereof.

20. The tire sealing composition of claim 17, wherein the aerosol propellant is selected from the group consisting of 2,3,3,3-tetrafluoropropene, cis-1,3,3,3-tetrafluoropropene, trans-1,3,3,3-tetrafluoropropene, and combinations thereof.

21. The tire sealing composition of claim 17, wherein the natural rubber latex is a highly filtered natural rubber latex having an average particle size of about 400 microns or less.

22. The tire sealing composition of claim 17, wherein the emulsifier constitutes at least about 2.0% by weight of the sealant concentrate.

23. The tire sealing composition of claim 22, wherein the emulsifier comprises an alkyl polyethylene glycol ether.

* * * * *